United States Statutory Invention Registration [19]

[11] Reg. Number: H413

Lelie [43] Published: Jan. 5, 1988

[54] MICROPHONE OUTPUT-LEVEL TESTER

[75] Inventor: Arthur S. Lelie, San Diego, Calif.

[73] Assignee: The United States of America as represented by the Secretary of the Navy, Washington, D.C.

[21] Appl. No.: 10,255

[22] Filed: Jan. 30, 1987

[51] Int. Cl.[4] ..... H04R 29/00

[52] U.S. Cl. ..... 381/58

[56] References Cited

U.S. PATENT DOCUMENTS

| | | | |
|---|---|---|---|
| 2,530,383 | 11/1950 | Estes et al. . | |
| 2,558,550 | 6/1951 | Fiske, Jr. . | |
| 3,093,711 | 6/1963 | Comerci et al. . | |
| 3,922,506 | 11/1975 | Frye . | |
| 4,296,483 | 10/1981 | Haill | 367/13 |
| 4,375,679 | 3/1983 | Park, Jr. et al. | 367/13 |

*Primary Examiner*—Stephen C. Buczinski
*Assistant Examiner*—Linda J. Wallace
*Attorney, Agent, or Firm*—Ervin F. Johnston; Thomas Glenn Keough

[57] ABSTRACT

A microphone such as that used in a shipboard public address system is tested for its output level by an integrated microphone tester. The microphone is secured in a specific proximity of a sound-level calibrator acoustic generator providing a known output level. An electronic circuit including an operational amplifier and associated circuitry is connected to the microphone to provide a voltage level read-out that correlates to the signal level received through the microphone. The tester assures an inherently high degree of reliability and enables relatively unskilled personnel to provide in situ testing with minimum disruption to the communication system with which the microphone is associated.

4 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROPHONE OUTPUT-LEVEL TESTER

STATEMENT OF GOVERNMENT INTEREST

The invention herein may be manufactured and used by or for the Government of the United States of America for governmental purposes without the payment of any royalties thereon or therefor.

BACKGROUND OF THE INVENTION

Communication systems such as public address system's often are used by a number of different operators. Misuse of the equipment such as by dropping the microphone, exposure to the elements and overdriving it can degrade performance irrespective that some microphones are predesigned to perform well under these adverse conditions. As a consequence, some of the microphones provide too low an output voltage for satisfactory operation. The microphones need to be tested periodically and, of course, when some do not meet the minimum output requirements, they are replaced.

The conventional testing procedure has been too slow and laborious and has required skilled technicians for this time consuming task. A sound level calibrator has been hand held on the microphone with connector output pins from the microphone clip-connected to a volt meter. Because minimum voltages were required at each of the various frequencies to indicate a satisfactory performance, meter readings were noted and recorded at these frequencies. Because of being hand held and the difficulties of securely affixing monitoring instrumentation, erroneous indications of malfunction could occur since variations of only a few millivolts might be produced that were due to misorientation of the microphone and the interconnected monitoring meter. This could be wasteful since slight millivolt variations could erroneously indicate a defective microphone and the time and effort taken to stabilize the test may not be cost effective.

Thus, there is a continuing need in the state of the art for an in situ microphone test instrumentation that is reliable, not unduly time consuming and may be administered by relatively unskilled technicians.

SUMMARY OF THE INVENTION

The present invention is directed to providing a work-site-portable integrated microphone output level tester. The tester precisely positions and holds a microphone in the proximity of a sound level calibrator acoustical generator. An electronic monitoring circuit fabricated from an interconnected operational amplifier network has a stability for detecting millivolt output variations of the microphone to determine its operability.

The prime object is to provide a microphone test instrument that is faster, more accurate and allows a reliable microphone testing.

Another object is to provide for an integrally connected microphone output level tester capable of in situ application without introducing ambient influences.

Still another object is to provide for a microphone output level tester that accurately reproduces testing conditions to assure uniformity and reliability.

Still another object is to provide for an integrated microphone output level tester giving a hands free operation after a microphone and sound generator are in position to improve reliable testing.

These and other objects of the invention will become more readily apparent from the ensuing specification when taken with the drawings and in conjunction with the appended claims.

DESCRIPTION OF THE PREFERRED EMBODIMENT

Figure 2:
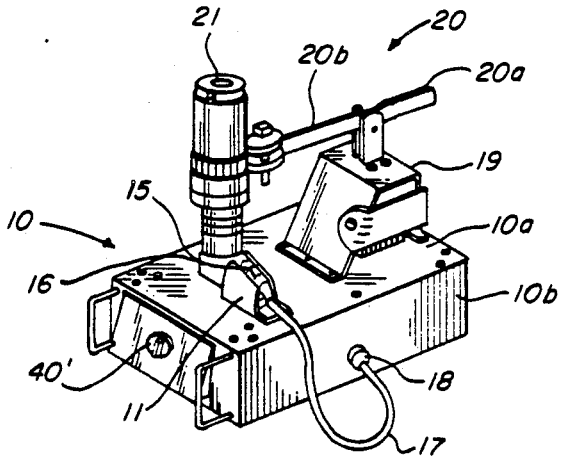
FIG. 2 depicts the microphone-cord-plug combination undergoing an operational test.
Figure 1:
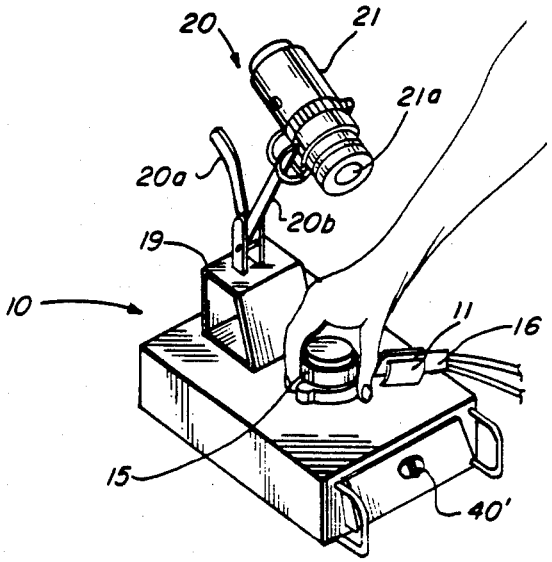
FIG. 1 shows a microphone being placed on an integrated microphone output level tester prior to being tested.

Referring now to FIGS. 1 and 2 of the drawings, an integrated microphone output level tester 10 has a spring biased or clamp-like holder 11 mounted on an upper surface 10*a*. The holder is bonded or otherwise suitably affixed on the tester's upper surface and is fabricated from a spring-like material that is shaped to grip a microphone 15 at its handle portion 16. The holder thusly securely holds the microphone on the tester and a cord 17 from the microphone terminates in a male or female plug 18. This plug is fitted into a mating plug 18' provided in a sidewall 10*b* of the tester.

A bracket 19 is mounted on the upper surface of the tester and functions as an articulable member 20 that supports a sound generator 21. The sound generator can be a model 1562-A marketed by General Radio and has the capability for generating and projecting discretely monitorable sound levels from its projection end 21*a*.

FIG. 1 shows the sound generator articulated to an up position by arm portions 20*a* and 20*b* of the articulable member while the microphone is being placed in holder 11. During a subsequent test, the sound generator is moved downwardly by arms 20*a* and 20*b* to position the sound generator adjacent microphone 15 for a test. The articulable member is constructed to rotate both arms 21*a* and 21*b* to an upward position while a microphone is being placed on the tester and both arms 21*a* and 21*b* downward to a substantially colinear locked position when the microphone is properly placed. Although the placement of the sound generator in FIG. 2 is shown to be adjacent the microphone, the final test position can locate the sound generator a different measured distance from the microphone if desired. Care must be taken however, that the spacing between the microphone and the generator is the same for other microphone's to be tested. This must be to assure that the test conditions remain constant and uniform for reliable test results.

Figure 3:
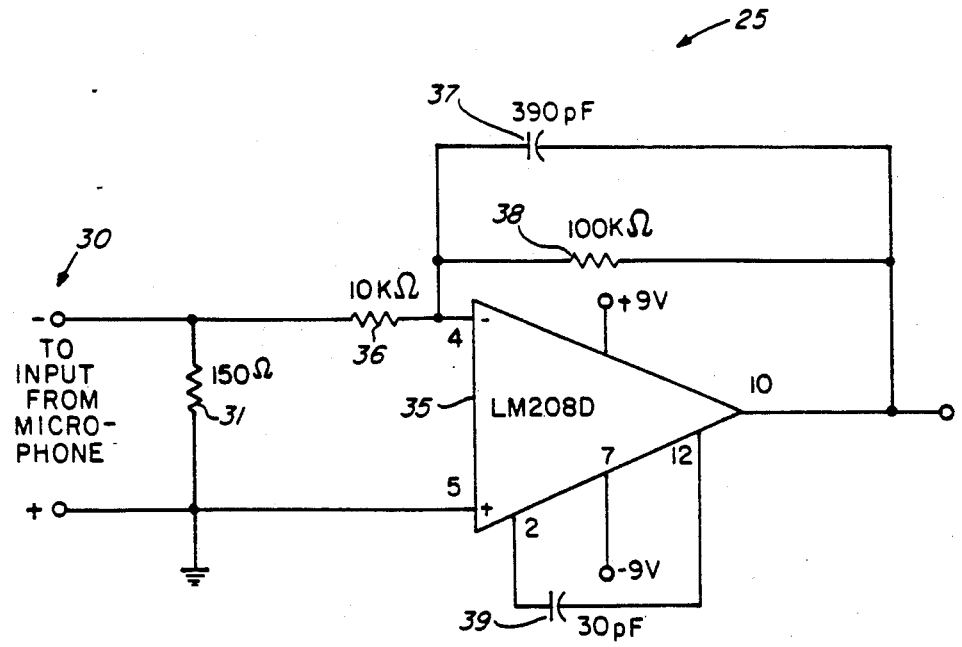
FIG. 3 is a schematic diagram of the operational amplifier and associated circuitry of the integrated microphone output level tester.
Figure 4:
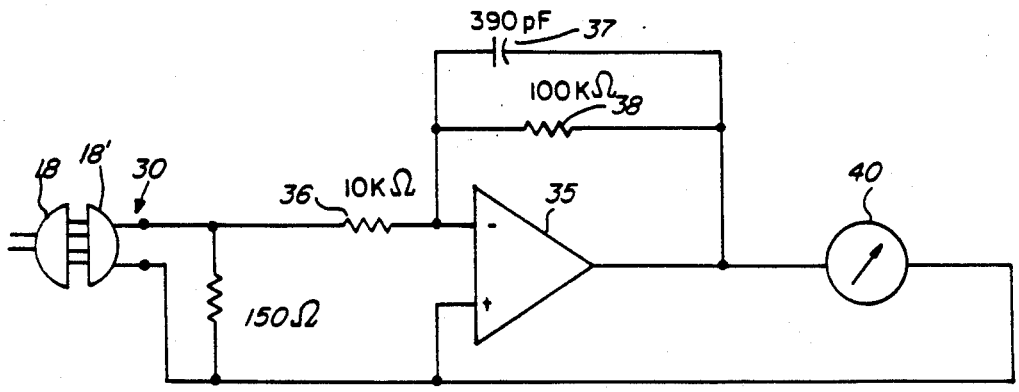
FIG. 4 is an overall schematic depiction of the tester.

A circuit board is located under surface 10*a* and contains the monitoring electronics 25, see FIG. 3. Input terminals 30 receive the signals from plug 18 and 18' that come from interconnected microphone 15. The input is shunted by a 150 ohm resistor 31 which functions as a load for the microphone.

An operational amplifier 35 is used in the configuration of a low pass filter with a gain of ten at zero frequency. The low pass filter is first order. A corner frequency, 4081 Hz, is down 3 db from the maximum gain of ten. The operational amplifier chosen is a model LM208D marketed by National Semiconductor. This op amp, along with a serially connected 10K resistor 36, shunt connected 390 pF capacitor along with 100KΩ shunt resistor 39 and a 30pF shunt capacitor 39 electronically cooperate to filter out unwanted high frequency noise.

A volt meter 40 is coupled to the output of the operational amplifier to provide a digital readout which is steady and easy to ready. Volt meter 40 may be located in a front panel of the tester as 40' and is so located to give a technician an unimpeded view of signal magnitude. Optionally, the meter may be external of the tester and the reference character 40' could designate a switch to turn electronics 25 on. A Data Precision Multimeter #175 has been selected as a suitable meter to give the required readout over the frequency range of interest. The proper magnitude signals for this meter over the frequency range that the microphones are to be tested are assured by the components as indicated so that reliable, repeatable observations of microphone performance can be made.

In operation, a microphone 15 to be tested is placed in holder 11 which grasps its handle 16. The angle at which the microphone is oriented is such as to cause the voice pick-up surface of the microphone to lie in the horizontal plane, upwardly facing. Sound generator 21 is placed over the microphone with its projection surface 21*a* lying substantially adjacent the microphone. Arms 20*a* and 20*b* of articulable member 21 are locked in their in-line position to assure that the sound generator is securely positioned during this testing operation as well as for subsequent testing operations with other similarly configured microphones. (At the conclusion of this test cycle control arm 20*a* is rotated upward and raises arm 20*b* and sound generator 21 off the microphone to assume the position in FIG. 1). The downward rotation of arm 20*a* firmly places and secures sound generator 21 adjacent the microphone. Now, an operator need only observe the instructions, not shown in the drawings, for testing a microphone which may be conveniently posted on upper surface 10*a* of the tester at a location adjacent where microphone 15 is secured. Microphone plug 18 is put into the mating fitting on side 10*b* of the tester.

Sound generator 21 is turned to a battery test position for a couple of seconds and then turned to 200 Hz until a clear tone appears. It is then selectively adjusted to a desired frequency. When amplifier 35 has been actuated either before the beginning of the test or, now, by a suitable switch, not shown, the reading provided by volt meter 40 is noted. Meter readings for frequencies of interest must exceed certain predetermined magnitudes which are dependent upon the type of microphone and the signal parameters associated with it. The meter reading, for example, might be taken at 200 Hz, 500 Hz, 1000 Hz and 2000 Hz so that the microphone's performance at these audio frequencies can be noted.

At the conclusion of a test as outlined above, the microphone is removed from holder 11 and reused or discarded as the test results indicate. A subsequent testing operation for another microphone only requires the moving of tester 10 to the location of the other microphone and mounting the other microphone in place and starting the test. These tests require no special skills, are quickly performed and provide uniformity of results.

Obviously, many modifications and variations of the present invention are possible in the light of the above teachings. It is therefore to be understood that within the scope of the appended claims the invention may be practiced otherwise than as specifically described.

I claim:

1. An apparatus for testing the output level of a microphone comprising:
   - means for holding the microphone in place;
   - means for generating frequencies in the audio range;
   - means for securely positioning the microphone at a predetermined location with respect to the generating means; and
   - means coupled to the microphone for monitoring the output level intensity at the frequencies in the audio range.

2. An apparatus according to claim 1 in which the holding means, the generating means, the securely positioning means and the monitoring means are all mounted on a common chassis.

3. An apparatus according to claim 2 in which the holding means is a clamp sized to engage a handle of the microphone, the generating means is an audio frequency generator, the securely positioning means is a pair of articulable arms and the monitoring means is an electronic circuit coupled to a voltmeter.

4. An apparatus according to claim 3 in which the electronic circuit includes:
   - a mating receptacle having a pair of leads adapted to receive a plug from the microphone;
   - a 150 ohm shunt resistor connected across the leads coming from the mating receptacle;
   - a 10K-ohm resistor connected to one lead coming from the receptacles;
   - an operational amplifier having one input connected to the 10K-ohm resistor and another input connected to the other lead from the receptacle;
   - a 100K-ohm resistor connected between a negative input of the operational amplifier and an output from the operational amplifier;
   - a 390 picofarad capacitor connected in parallel with the 100K-ohm resistor, and
   - a 30 picofarad capacitor connected to stabilization terminals of the operational amplifier for the purpose of stabilizing the operational amplifier, the voltmeter connected to the output of the operational amplifier.

* * * * *